Sept. 21, 1943.                F. E. JOHNSON                2,329,909
                            ROTARY FASTENER STUD
                            Filed April 16, 1942
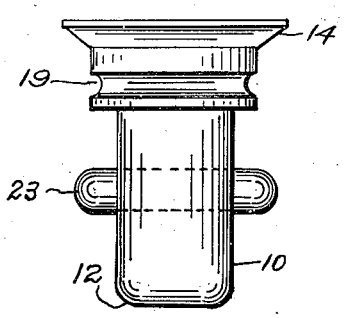
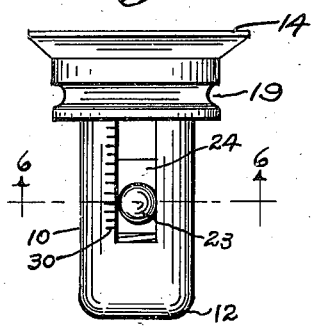
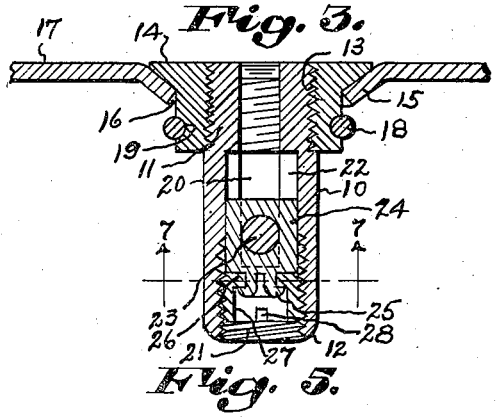
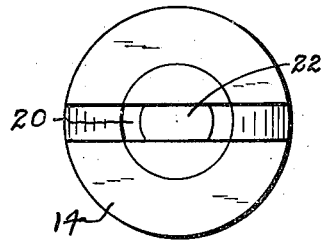
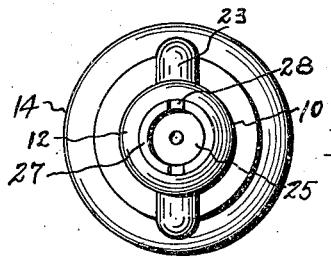
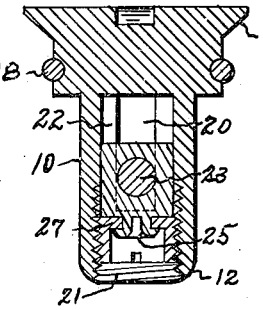
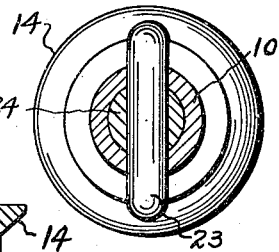
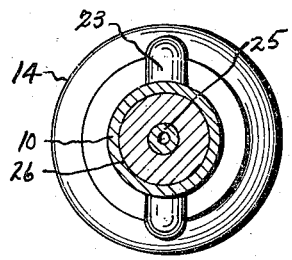
Inventor:
Frank E. Johnson.
By Walter S. Jones
Att'y.

Patented Sept. 21, 1943

2,329,909

UNITED STATES PATENT OFFICE 2,329,909

ROTARY FASTENER STUD

Frank E. Johnson, Malden, Mass., assignor to United-Carr Fastener Corporation, Cambridge, Mass., a corporation of Massachusetts Application April 16, 1942, Serial No. 439,179

6 Claims. (Cl. 24—221)

The present invention relates to improvements in fastener installations and particularly to rotary fastener studs for cowl fasteners and the like employing a rotary stud member attached to one part of the cowling and formed with a transverse pin or member adapted to be interlocked with a female fastener member attached to the other part of the cowling. One type of fastener I have in mind is illustrated and described in my copending application, Serial No. 239,815, filed November 10, 1938, now Patent Number 2,309,731, issued February 2, 1943.

Variations in the thickness of the cowling or like sheets which are to be secured together require production of studs with the transverse pins at various distances from the head end, and as the stud pin must cooperate with the female fastener member to lock the parts together under considerable pressure, the use of studs of various lengths is only partly satisfactory to meet the problems presented by varying thicknesses of cowling sheets.

The present invention aims to improve rotary stud members, of the type described, by the provision of a stud having a transverse pin which is readily adjustable to various distances from the head.

Illustrative of the invention, reference is made to the accompanying drawing illustrating preferred embodiments, and in which Fig. 1 is a side elevation view of a cowl fastener employing a rotary stud of the present invention;

Fig. 2 is an enlarged side elevation of the stud;

Fig. 3 is a central vertical sectional view showing the stud assembled to a support;

Fig. 4 is a plan view looking at the head end of the stud;

Fig. 5 is a plan view looking at the nose end of the stud;

Figs. 6 and 7 are horizontal sectional views taken on the lines 6—6 and 7—7 of Figs. 2 and 3 respectively; and Fig. 8 is a sectional view of a modified form of stud.

Cowl fasteners of the type referred to for securing a plurality of sheets of metal, wood, or the like, such as airplane cowling, together, usually comprise a stud member rotatably mounted in one of the sheets and a female fastener member (not shown) formed with a stud-receiving opening and mounted on another sheet. One face of the fastener member is formed with a suitable seat for engagement with a transverse pin on the stud to hold the sheets securely under high pressure.

It will be apparent that the positioning of the transverse pin of the stud must be determined with considerable accuracy depending upon the thickness of the cowling sheets to be fastened and the type of female fastener member used. If the sheets are thinner, the pin will not exert the desired clamping pressure on the seat, and if thicker, difficulty may be experienced in rotating the stud to locked position.

The present invention provides an improved stud member having a transverse seat-engaging and locking pin adjustable along the length of the stud so that the pin may be readily and properly located at the desired position with reference to the head.

In the illustrated embodiment of the invention, the stud preferably comprises a shank 10 having a base end 11 at one end and a nose 12 at the opposite end. The base end 11 is externally threaded as at 13 to receive a separate head 14 of desired shape and construction. Preferably, the head is conical to fit in a conical seat 15 surrounding an aperture 16 in supporting sheet 17, so that the stud may be assembled with the plate in a flush manner, as shown in Fig. 3. The stud is held in assembled position with the plate by a ring-like spring 18 snapped into an annular recess or groove 19 on the head, as clearly shown in Fig. 3.

The shank 10 is preferably formed with a slot 20, as by milling, extending from the base end a substantial portion of the length of the skirt. The shank, furthermore, is bored from the nose end to provide a nut-receiving bore 21 and an inner pin block-receiving counterbore 22 which communicates with the slot 20.

The transverse pin 23 is mounted in a pin block 24 slidable in the bore 22 which may be formed with an integral rivet 25, or the like, for securing the block 24 to an apertured base 26 of a hollow adjusting nut 27 threaded in the bore 21. The open end of the nut 27 may be formed with slots 28 to receive a tool for rotating the nut or the interior of the nut may be non-circular to receive the end of a tool for rotating the nut.

In assembly, the block 24 is inserted in the bore 22 from the nose end 12 of the shank and the pin 23 is fitted through the slots 20 in the block and secured to the latter by a drive fit. In this position the rivet 25 extends toward the nose end and is positioned centrally of the bore by reason of the concentricity of the bores 21 and 22.

The cup-shaped adjusting nut is then threaded into the bore so that the rivet extends through the aperture in the base 25 thereof, whereupon the rivet 24 is upset over the inner face of the bottom to secure the nut and block together against axial separation. The rivet 24 should have a relatively loose or slip fit with the bottom 26 of the nut 27 to permit relative rotation of the two parts.

It will be apparent that as the bores 21 and 22 are longer than the nut 27 and the pin block 24 respectively, adjustment of the nut 27 and block 24 longitudinally in their respective bores is permitted. As the pin 23 extends through the oppositely disposed slots 20 of the shank 10 it is prevented from rotating relative to the shank, so that a predetermined positioning of the pin 23 will always effect a desired locking action on the female fastening members.

If desired, a face of the stud shank 10 adjacent one or both slots may be provided with graduations 30 (Fig. 2) to cooperate with suitable indicia on the pin to facilitate accurate predetermined adjustment of the pin along the shank.

In Fig. 8 I have illustrated a second form of my improved stud which operates in the same manner as described in connection with the stud shown in Figs. 1 to 7 inclusive. This second form differs from the first form only as to construction and, as illustrated, the head 14 is integral with the shank 10. The remainder is the same as shown in Fig. 3 and the only real difference is in the method of manufacture. In the form shown in Fig. 8 the slot 20 would have to be broached or milled from the side of the shank, whereas it is milled from the base end in the other construction.

Although I have illustrated and described preferred embodiments of my invention, I do not wish to be limited thereby because the scope of my invention is best defined by the following claims.

I claim:

1. A rotary stud member for separable fastener installations comprising a hollow shank having head and nose portions, the sides of said shank being slotted from said head to said nose, a transverse pin mounted in the interior of said shank and extending through said slots, and means operably mounted within said shank for adjusting said pin bodily in said slots.

2. A rotary stud member for separable fastener installations comprising a shank having head and nose portions, a nut-receiving bore in the nose portion, the body of the shank being counterbored between the nut-receiving bore and head, said shank being slotted from the head to the nose providing opposed slotted sides for the counterbored portion, a transverse pin extending through the counterbore and through the slots in the sides thereof, and a nut member threaded in said nut-receiving bore and connected to said pin for adjusting the latter bodily in said slots.

3. A rotary stud member for separable fastener installations comprising a shank having head and nose portions, a nut-receiving bore in the nose portion, the body of the shank being counterbored between the nut-receiving bore and head, said shank being slotted from the head to the nose providing opposed slotted sides for the counterbored portion, a pin block mounted in said counterbore, a transverse pin mounted in said block and extending through the slots in the sides of the counterbore, a nut adjustably mounted in the nut-receiving bore and means swively connecting the nut to the block.

4. A rotary stud member for a rotary type separable fastener adapted to be rotatably mounted in an apertured supporting member, said stud member having a transverse pin mounted therein for cooperation with a female fastener member and adjustable pin-carrying means assembled with said stud whereby said pin may be adjusted longitudinally of said stud to accommodate the stud to apertured members of various thicknesses.

5. A rotary fastener stud member for a separable fastener having a shank portion, a head portion, a transverse pin extending through said shank portion and pin-carrying means in the threaded connection with said shank portion for adjusting said pin longitudinally relative to said shank portion.

6. A rotary fastener stud member for a separable fastener having a shank portion provided with a bore and a transverse slot, a head portion on said shank portion, a part located in the bore of said shank portion and movable longitudinally therein, a transverse pin carried by said part and extending through said slot and projecting at opposite sides of said shank portion and a threaded connection between said shank portion and said part carrying said pin whereby said pin may be adjusted longitudinally relative to said shank portion and held in any position relative thereto.

FRANK E. JOHNSON.